Feb. 27, 1951 E. L. BARRETT 2,543,483

MAGNETIC RECORDING APPARATUS

Original Filed March 22, 1947 2 Sheets-Sheet 1

INVENTOR
Edward L. Barrett
By Carlson, Pitzner, Hubbard & Wolfe
ATTORNEYS

Feb. 27, 1951 E. L. BARRETT 2,543,483

MAGNETIC RECORDING APPARATUS

Original Filed March 22, 1947 2 Sheets-Sheet 2

INVENTOR
Edward L. Barrett
By Carlson, Pitzner, Hubbard & Wolfe
ATTORNEYS

Patented Feb. 27, 1951 2,543,483

UNITED STATES PATENT OFFICE 2,543,483

MAGNETIC RECORDING APPARATUS

Edward L. Barrett, La Grange, Ill., assignor to Edward L. Barrett and Ann K. Barrett, copartners, doing business as Barrett-Keenan Company Original application March 22, 1947, Serial No. 736,603. Divided and this application January 19, 1948, Serial No. 3,149

4 Claims. (Cl. 179—100.2)

The present application is a division of my earlier application Serial No. 736,603, filed March 22, 1947.

The present invention pertains to record mechanisms and more particularly to such mechanisms in which a record is magnetically impressed upon, or reproduced from, a paramagnetic (magnetizable) tape. The mechanism here disclosed is useful either in recording or reproducing, or both, as will presently appear in greater detail.

The record "tape" itself is but one component element of record mechanisms here contemplated and may be variously constituted. Presently there is such a tape on the market made of paper and coated or impregnated with finely divided paramagnetic material. Such tape is an example of one that may be employed. In my earlier filed application Serial No. 736,603 referred to above, I have disclosed a cartridge type of tape unit in which the record tape is stored in accordion pleated form. The present invention contemplates the use of a record tape stored or bundled in such accordion pleats or folds.

The primary aim of the present invention is to avoid interference with good reproduction which might otherwise result from the folding of the tape. It will be appreciated that with such folds or creases in the tape as are necessitated when it is accordion pleated, the paramagnetic coating is likely to be cracked or otherwise impaired along the line of fold or crease.

Further objectives and advantages of the present invention will become apparent as the following description proceeds, taken in connection with the accompanying drawings, in which.

Although certain particular embodiments of the invention have been illustrated and described in some detail herein, there is no intention to thereby limit the invention to such specific form. On the contrary, the intention is to cover all modifications and alternative arrangements and constructions falling within the spirit and scope of the invention as expressed in the appended claims.

Figure 1:
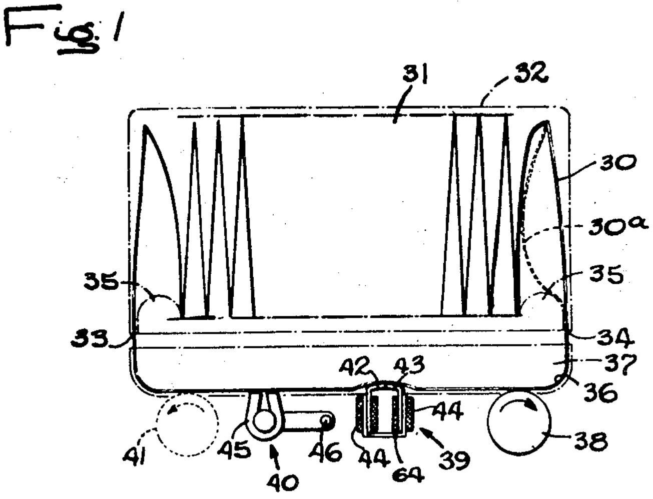
Figure 1 is a generally diagrammatic plan view of a record apparatus in which a record tape is stored in accordion pleated form.

Referring more particularly to the illustrative form of the invention here shown, reference may first be made to the diagrammatic layout depicted in Fig. 1. In the installation there indicated a resilient, paramagnetic record tape 30 is provided, being fashioned in this instance as an endless loop. The bulk or major portion of such loop or tape is housed in a storage chamber 31 defined by a box-like casing indicated in dot-dash lines at 32. In the event that a coated or other type of tape is used which is paramagnetic on only one side, the loop is arranged with the sensitive side of the tape on the outside of the loop.

The tape 30 is creased transversely at uniformly spaced points throughout its length to effect an accordion pleating or zigzag form of the same. The tape, so creased, is bundled accordion fashion within the chamber 31 and led out from the chamber through openings 33 and 34 arranged adjacent the opposite ends of the casing. In this instance the openings are located substantially at two adjacent end corners, being fashioned in a longitudinal side wall of the casing. The lower side wall of the casing 32, in which the openings 33, 34 are located, has smoothly rounded inwardly extending projections 35 thereon, disposed inboard of the respective openings. These projections 35 aid in causing the tape to assume its proper accordion configuration within the chamber and in retaining its configuration.

The portion or bight 49 of the tape 30 extending between the openings 33, 34 exteriorly of the chamber 31 is led over a smoothly contoured guide surface constituted in this instance by a wall of a channel 36 (see also Fig. 4) fashioned in a longitudinally split block 37 which is structurally separate from the casing 32. The outer wall of the channel 36 is apertured at spaced points along its length for reception of various associated devices including a friction feed or guide wheel 38, a recorder-reproducer head 39, and an "eraser" head 40, and if desired a reversing drive wheel or roller 41.

The structure of the recorder-reproducer head 39, which is of special importance here, is detailed below. For the present, in connection with the over-all operation, suffice it to note that the recorder-reproducer head 39 presents a pair of pole pieces 42, 43 to the tape and over which the tape rides. Energizing windings 44 encircle the pole pieces. The usual electronic equipment (not shown) well known in the art may be used for energizing the windings 44 to impress a desired magnetic pattern on the tape. Or alternatively, a sound record in the form of a magnetic pattern impressed on the tape may be used to vary the excitation of the windings 44 for audible reproduction of such sound record. To "erase" a magnetic record from the tape 30, a high frequency alternating current, or a direct current, may be applied to the windings 44. Alternatively, an eraser head such as 40 may be employed. Such eraser head is shown as including a horseshoe shaped permanent magnet 45 carried by an arm pivoted at 46 to swing into and out of operative relation with the tape. If it is desired to reverse the direction of tape movement for any reason, a second feed roller 41, revolving in a direction opposite to that for 38, may be used. Suitable constant speed drive motors (not shown) may be used for revolving the feed rollers 38 and 41 in appropriate directions.

As the roller 38 shoves the tape 30 endwise through the entrance opening or throat 34, it is laid down automatically in the chamber 31 in successive accordion pleat folds and at the same time the tape is progressively withdrawn, fold by fold, through the exit opening 33 at the opposite end of the chamber. Assuming that the tape is in the full line position shown in Fig. 1, as more tape is shoved through the entrance opening 44, the last fold of tape buckles to the left to the dotted line position indicated as 30a. With continued pressure of the entering tape, the crease at the bottom of the fold which is being formed is pushed over the top of the adjacent projection 35 and snaps into place behind the latter. The following portion of tape then moves upward, starting the next fold.

Returning now to the matter of the special recorder-reproducer head 39, the same may take a variety of forms, it being desirable, however, that two general characteristics or features be embodied. One is that the pole pieces of the head should be arranged so as to extend inwardly toward each other with a very narrow gap between them and contoured for the tape to run over the surface of such opposed ends and across the edge of the gap. The second is that the gap should be disposed at an angle with respect to the path of travel of the tape, preferably of the order of 60° as shown.

Figure 2:
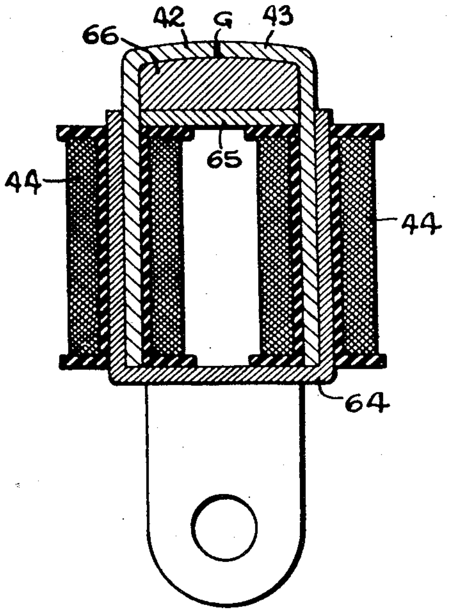
Fig. 2 is an enlarged longitudinal sectional view of a special recorder-reproducer head included in the apparatus of Fig. 1.
Figure 3:
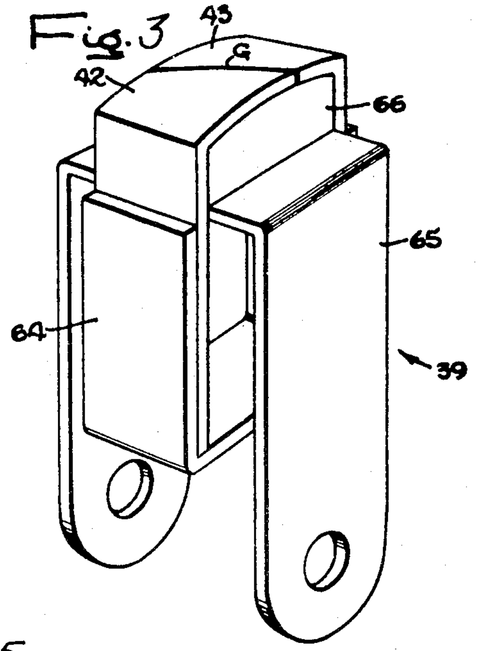
Fig. 3 is a perspective view of the head shown in Fig. 2.

The particular head structure illustrated is one well suited for quantity production. In it the pole pieces 42, 43 are fashioned as metal stampings of inverted L shape and are joined at their lower ends by a U-shaped metal stamping or core 64 (Figs. 2 and 3) which completes a magnetic circuit between them. The actuating windings 44 encircle respective ones of the pole pieces, aiding in clamping the legs of the U-shaped piece 64 to them. Both the pole pieces and the U-shaped piece 64 are made of soft iron or other suitable magnetizable material. Straddling the assembly at right angles to the U-shaped core piece 64 is an inverted U-shaped bracket 65 made of brass or other nonmagnetic material, with a spacer 66, likewise made of nonmagnetic material, interposed between it and the overlying ends of the pole pieces.

Figure 5:
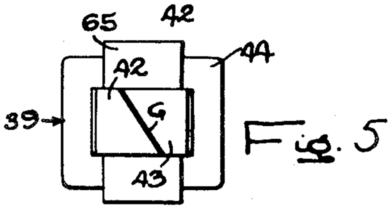
Fig. 5 is a face view, on somewhat reduced scale, of the reproducer head shown in Figs. 2 and 3.
Figure 6:
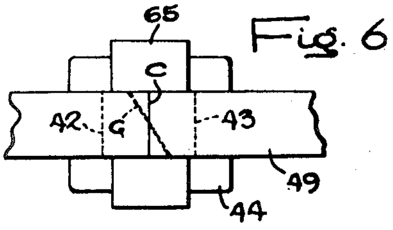
Fig. 6 is a view similar to Fig. 5 but showing the tape in the position which it occupies as it passes across the head.

The gap G (Figs. 2, 5 and 6) between the opposed ends of the pole pieces 42, 43 is located so as to be on a bias or angle of approximately 60° with respect to the longitudinal axis or path of travel of the portion 49 of tape passing over it. By virtue of such arrangement, any tendency for the creases in the tape to impair the fidelity of sound reproduction is overcome. One such crease is indicated at C in Fig. 6. It will be observed that as this crease passes over the gap between the pole pieces, there is never at any instant more than a very minute length of the crease actually registering with the gap. As a consequence, successive creases passing over the head do not cause corresponding successive clicks in the sound reproduction, even though the tape has been used for a long time and the paramagnetic coating or impregnation is substantially impaired at the crease.

Figure 4:
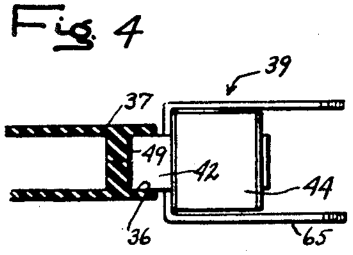
Fig. 4 is an end elevation on somewhat reduced scale of the head shown in Figs. 2 and 3, together with the adjacent portion of the storage case for the tape.

The width of the pole pieces 42, 43 is such that they may be entered in the channel 36 (Fig. 4). The inner wall of the channel at such points is slightly concaved to conform with the convexity of the outer faces of the pole pieces.

I claim as my invention:

1. In an apparatus of the general type set forth, having a casing defining a storage chamber, a paramagnetic record tape creased transversely at uniformly spaced intervals for accordion pleating of the same, said tape being bundled accordion-fashion in said chamber, and means including a friction drive roller for progressively withdrawing said tape fold by fold from the bundle and feeding it endwise, the combination comprising an electromagnetic head including an energizing winding and a pair of opposed pole pieces, said pole pieces being separated by a gap extending diagonally across the face of the head constituted by the ends of said pole pieces, and means for guidingly passing the endwise moving portion of said creased tape across said face of said head.

2. In an apparatus of the type set forth, the combination with a paramagnetic record tape transversely creased at uniformly spaced intervals for storage thereof in accordion pleated fashion and an electromagnetic head having a pair of opposed pole pieces with portions thereof turned inward toward each other to present smooth outer surfaces, the ends of said portions being in spaced relation and separated by a narrow gap, of means for guidingly passing said tape over the outer surfaces of said pole pieces and across the gap therebetween along a path which extends diagonally of said gap so that said creases are angled with respect to said gap as they pass over it.

3. In an apparatus of the type set forth, the combination of a paramagnetic record tape transversely creased at spaced intervals for storage in accordion pleated fashion, an electromagnetic head including an energizing winding and a pair of pole pieces, said pole pieces having portions turned inward toward each other with their ends disposed in opposed relation and presenting smooth outer surfaces, the ends of said pole pieces being separated by a narrow gap extending diagonally across the face of the head constituted by said outer surfaces of said pole pieces, and means for guidingly passing said creased tape endwise across said face of said head.

4. In an apparatus of the general type set forth, having a casing defining a storage chamber, a paramagnetic record tape creased transversely at uniformly spaced intervals for accordion pleating of the same, said tape being bundled accordion-fashion in said chamber, and means including a friction drive roller for progressively withdrawing said tape fold by fold from the bundle and feeding it endwise, the combination comprising an electromagnetic head including an energizing winding and a pair of opposed pole pieces, said pole pieces being separated by a gap extending across the face of the head constituted by the ends of said pole pieces, and means for guidingly passing the endwise moving portion of said creased tape across said face of said head along a path which extends diagonally of said gap such that said creases are angled with respect to said gap as they pass over it.

EDWARD L. BARRETT.

REFERENCES CITED

The following references are of record in the file of this patent:

UNITED STATES PATENTS

| Number | Name | Date |
|---|---|---|
| 2,109,627 | Finch | Mar. 1, 1938 |
| 2,344,615 | James | Mar. 21, 1944 |
| 2,351,007 | Camras | June 13, 1944 |

FOREIGN PATENTS

| Number | Country | Date |
|---|---|---|
| 884,881 | France | Aug. 30, 1944 |